United States Patent
Takahisa (10) Patent No.: US 7,712,103 B2
(45) Date of Patent: May 4, 2010

(54) METHOD AND SYSTEM FOR MANAGING LOAD BALANCING IN DATA PROCESSING SYSTEM

(75) Inventor: Takashi Takahisa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1303 days.

(21) Appl. No.: 11/199,244

(22) Filed: Aug. 9, 2005

(65) Prior Publication Data

US 2006/0212873 A1    Sep. 21, 2006

(30) Foreign Application Priority Data

Mar. 15, 2005    (JP) .............................. 2005-072505

(51) Int. Cl.
*G06F 9/46* (2006.01)
*G06F 15/16* (2006.01)
*G06F 15/173* (2006.01)

(52) U.S. Cl. .................. 718/105; 709/201; 709/226

(58) Field of Classification Search ................. 718/102, 718/103, 104, 105; 709/201, 226
See application file for complete search history.

(56) References Cited

U.S. PATENT DOCUMENTS

| | | | | |
|---|---|---|---|---|
| 5,031,089 | A * | 7/1991 | Liu et al. ..................... | 709/226 |
| 6,128,642 | A * | 10/2000 | Doraswamy et al. ........ | 709/201 |
| 7,062,556 | B1 * | 6/2006 | Chen et al. .................. | 709/226 |
| 2002/0087611 | A1 * | 7/2002 | Tanaka et al. ................. | 709/1 |
| 2005/0138626 | A1 * | 6/2005 | Nagami et al. ............... | 718/105 |

FOREIGN PATENT DOCUMENTS

| JP | 07-319834 | 12/1995 |
|---|---|---|
| JP | 2000-056996 | 2/2000 |

OTHER PUBLICATIONS

Jia et al. "A Load Balanced Service Based on Probabilistic Neural Network", Proceedings of the 2nd Intenational Conference on Machine Learning and Cybernetics, Nov. 25, 2003, pp. 1333-1336.*

* cited by examiner

*Primary Examiner*—Meng-Ai An
*Assistant Examiner*—Willy W Huaracha
(74) *Attorney, Agent, or Firm*—Mattingly & Malur, P.C.

(57) ABSTRACT

In a dynamic queue load balancing method using a plurality of computers, the load level of each computer is obtained. A queue management table including information on a queue length and the number of queued requests in each queue and a queue adjustment table including information on a queue length at each load level are referred to. The queue length in the queue management table is changed to the queue length in the queue adjustment table corresponding to the obtained load level by a storage device. A queue usage rate of queue is calculated from the queue length and the number of queued requests in the queue management table. Information on the calculated queue usage rate of queue is exchanged among the computers through a communication device. According to the exchanged information on the queue usage rate, selective assignment of a processing request among queues of the computers is performed.

9 Claims, 7 Drawing Sheets

| SERVER LOAD LEVEL (36) | QUEUE LENGTH (37) | NUMBER OF SIMULTANEOUSLY EXECUTING PROCESSES (38) |
|---|---|---|
| A | 40 | 4 |
| B | 30 | 3 |
| C | 20 | 2 |
| D | 10 | 1 |

FIG.8

| QUEUE IDENTIFIER (43) | SERVER LOAD LEVEL (44) | PRECEDING SERVER LOAD LEVEL (45) | QUEUE LENGTH (46) | NUMBER OF SIMULTANEOUSLY EXECUTING PROCESSES (47) | NUMBER OF QUEUED REQUESTS (48) | QUEUE USAGE RATE (49) |
|---|---|---|---|---|---|---|
| XXX | A | A | 40 | 4 | 20 | 0.5 |
| YYY | C | C | 20 | 2 | 10 | 0.5 |
| ZZZ | C | B | 30 | 3 | 25 | 2.0 |

METHOD AND SYSTEM FOR MANAGING LOAD BALANCING IN DATA PROCESSING SYSTEM

INCORPORATION BY REFERENCE

The present application claims priority from Japanese application JP2005-072505 filed on Mar. 15, 2005, the content of which is hereby incorporated by reference into this application.

BACKGROUND OF THE INVENTION

The present invention relates to a dynamic queue load balancing technique for performing selective assignment of a processing request among queues of a plurality of computers, thereby dynamically performing load balancing. More specifically, the invention relates to the technique that is effective for being applied to the dynamic queue load balancing technique in which a plurality of servers offer the same service and load balancing of client requests is performed among the servers.

As a conventional technique in this field, there is provided a load balancing method that uses a queue between a client and a server.

In this method, a client request is assigned to a queue with the smallest load through a load balancing mechanism, and by copying of the client request from the queue to other queues, load balancing is performed. According to this method, it is possible to achieve load balancing of client requests among the queues. JP-A-2000-56996 discloses this technique.

The disclosed method is the one in which load balancing is achieved through provision of a request scheduling computer equipped with the queue and a request processing computer (server), separately. The request scheduling computer performs queuing and scheduling of a processing request, while the request processing computer performs processing of the request. In this method, when it has taken much time for a certain request processing computer to process a certain processing request, the request is assigned to other request processing computer through the request scheduling computer. Load balancing with other free request processing computer thereby becomes possible.

These techniques aim at reduction of the average response time of a client request. In order to achieve this purpose, when a problem occurs in one of the servers at the time of processing a certain client request, it is so arranged that other server can process the client request. JP-A-7-319834 discloses the technique described above.

SUMMARY OF THE INVENTION

The load balancing methods described above improve fault tolerance. According to the load balancing methods described above, a client request is properly processed by an overall system, and the average response time of the client request is optimized in the overall system and becomes faster. The standard deviation of the response time of the client request, however, is not taken into consideration in these methods. For this reason, depending on the server to which the client request is assigned, the response time of the client request may become much slower than the average response time, so that other processing may be delayed due to waiting for the request from which no response is returned, or a time out error may be produced. Alternatively, the response of the client request that has been made later may be returned faster than the response of the client request that has been made earlier.

An object of the present invention is therefore to provide a technique that solves the problems described above and reduces the standard deviation of the response time of a processing request, thereby enabling all the responses of the processing requests to be returned within a predetermined period of time.

In the dynamic queue load balancing system of the present invention, selective assignment of a processing request is performed among queues of a plurality of computers, thereby dynamically performing load balancing. In this system, the queue length of each computer, which is the number of processing requests capable of waiting in a queue until they are processed, is dynamically changed according to a load on each of the computers.

In the load balancing system of the present invention that uses the queues, a client request is assigned to a queue with the lowest queue usage rate of queue. The queue usage rate of queue is calculated by dividing the number of queued requests in a queue by the length of the queue or queue length. Then, by dynamically changing the queue length according to a load on a server, the period of time during which the request waits to be processed can be made to be substantially the same as those in the queues of other servers that offer the same service. Further, by changing the number of requests to be processed simultaneously by the server, or the number of simultaneously executing processes, the period of time during which server processes the request can be made to be substantially the same as those with other servers that offer the same service. The standard deviation of the response time of the client request can be thereby reduced.

According to the present invention, by reducing the standard deviation of the response time of a processing request, it is possible to make the responses of all the processing requests to be returned within the predetermined period of time.

DETAILED DESCRIPTION OF THE EMBODIMENTS

A description will be directed to a dynamic queue load balancing system according to an embodiment of the present invention. The dynamic queue load balancing system of the present invention performs selective assignment of a processing request among queues of a plurality of computers, thereby dynamically performing load balancing.

Figure 1:
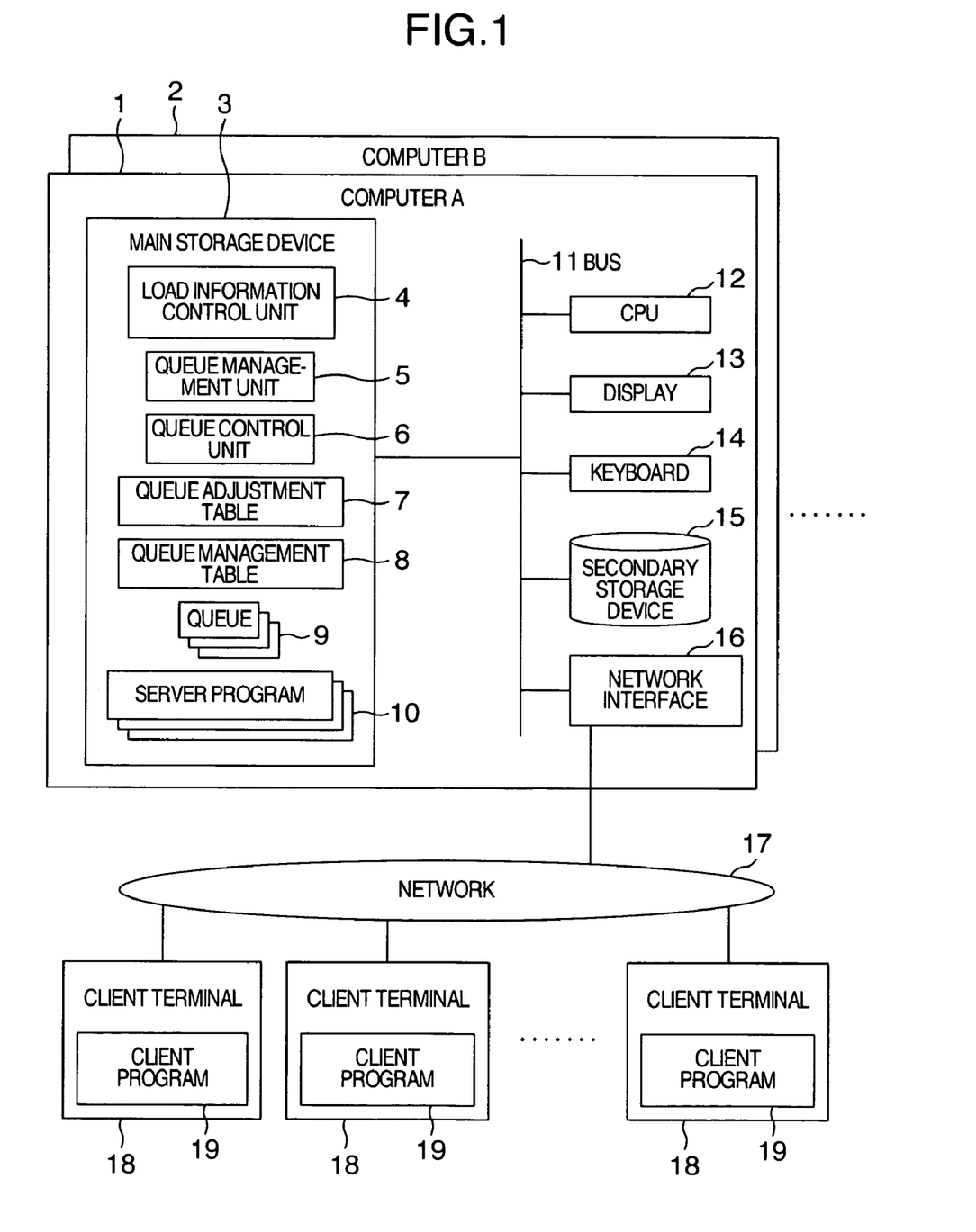
FIG. 1 is a diagram showing a schematic configuration of a load balancing system according to an embodiment of the present invention.

FIG. 1 is a diagram showing a schematic configuration of the load balancing system in this embodiment. As shown in FIG. 1, a computer in this embodiment includes a load information control unit 4, a queue management unit 5, and a queue control unit 6.

The load information control unit 4 is a processing unit for exchanging information on the usage rate of each queue calculated through the use of a queue control table 8 among the computers through a network interface 16. The queue management unit 5 is a processing unit for performing selective assignment of a processing request according to the usage rate of each queue exchanged among the computers.

The queue control unit 6 is a processing unit for obtaining a load level showing the load level of a computer, changing a queue length in the queue management table 8 to a queue length in the queue adjustment table 7 corresponding to the obtained load level by a main storage device 3, and calculating the queue usage rate of queue of the computer from the number of queued requests and the queue length in the queue management table 8.

A program for causing the computer to function as the load information control unit 4, queue management unit 5, and queue control unit 6 is recorded on a recording medium such as a CD-ROM or the like, for storage on a magnetic disk or the like. Then, the program is loaded into a memory, for execution. The recording medium on which the program is recorded may be a recording medium other than the CD-ROM. Alternatively, the program may be installed into an information processing device from the recording medium, for use, or the recording medium may also be accessed through a network to use the program.

The load balancing system in this embodiment is implemented by a plurality of computers and a plurality of client terminals connected through a network 17. A computer A 1 includes the main storage device 3, a CPU 12, a display 13, a keyboard 14, a secondary storage device 15, the network interface 16 connected by a bus 11. The main storage device 3 includes the load information control unit 4, queue management unit 5, queue control unit 6, queue adjustment table 7, queue management table 8, a queue 9, a server program 10, and the like. A plurality of queues 9 or a plurality of server programs 10 may be disposed in the main storage device 3. Further, a client terminal 18 includes a client program 19. A plurality of computers is present in the system and performs load balancing while monitoring load conditions of other computers by one another. The computers include the ones such as the computer A 1, a computer B 2, and the like. Alternatively, programs or objects that execute processing described above may be employed.

Figure 2:
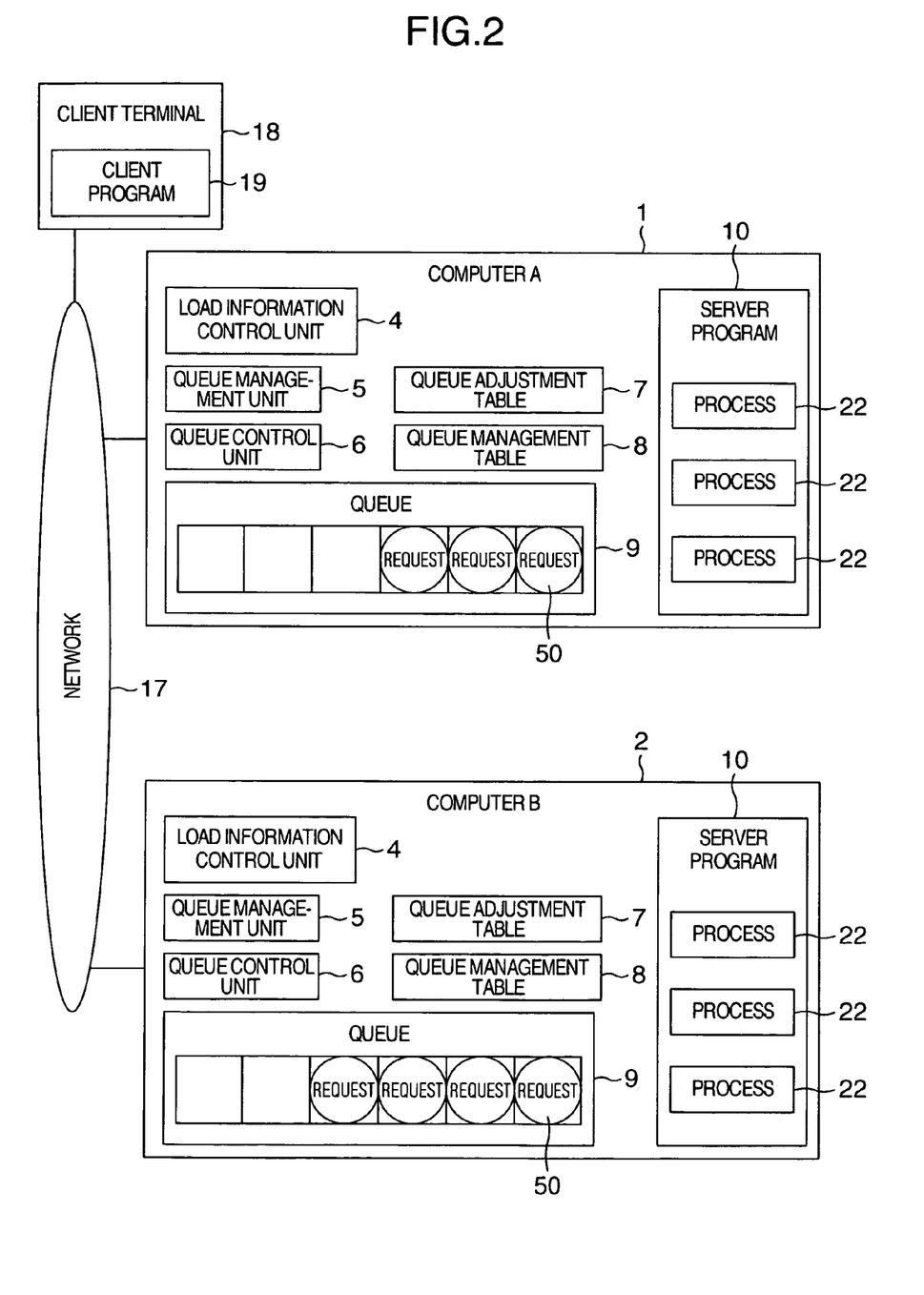
FIG. 2 is a diagram showing an example in which load balancing is performed between two units of computers.

FIG. 2 is a diagram showing an example of a state in which load balancing is performed between two units of the computers in this embodiment. The load balancing according to this embodiment will be described below with reference to FIG. 2.

The load information control unit 4 of each of the computers exchanges information on the usage rate of each queue at predetermined intervals of time. In the state shown in FIG. 2, the usage rate of queue of the computer A 1 is 3/6=0.5, while the usage rate of queue of the computer B 2 is 4/6=0.67. It is assumed that in this state, the client program 19 on the client terminal 18 transmits a client request to the computer A 1 or B 2. It is assumed herein that the client program has been transmitted to the computer B 2.

Next, the queue management unit 5 of the computer B 2 obtains the usage rates of the respective queues from the load information control unit 4 and assigns the client request to the queue 9 of the computer A 1 having the lower usage rate of the queue 9. Then, the queue 9 of the computer A 1 sorts and distributes the client request to the server program 10 of the computer A 1 in turn. When a process 22 in the server program 10 is finished, the computer A 1 returns a response to the client program 19 though the network 17.

Figure 3:
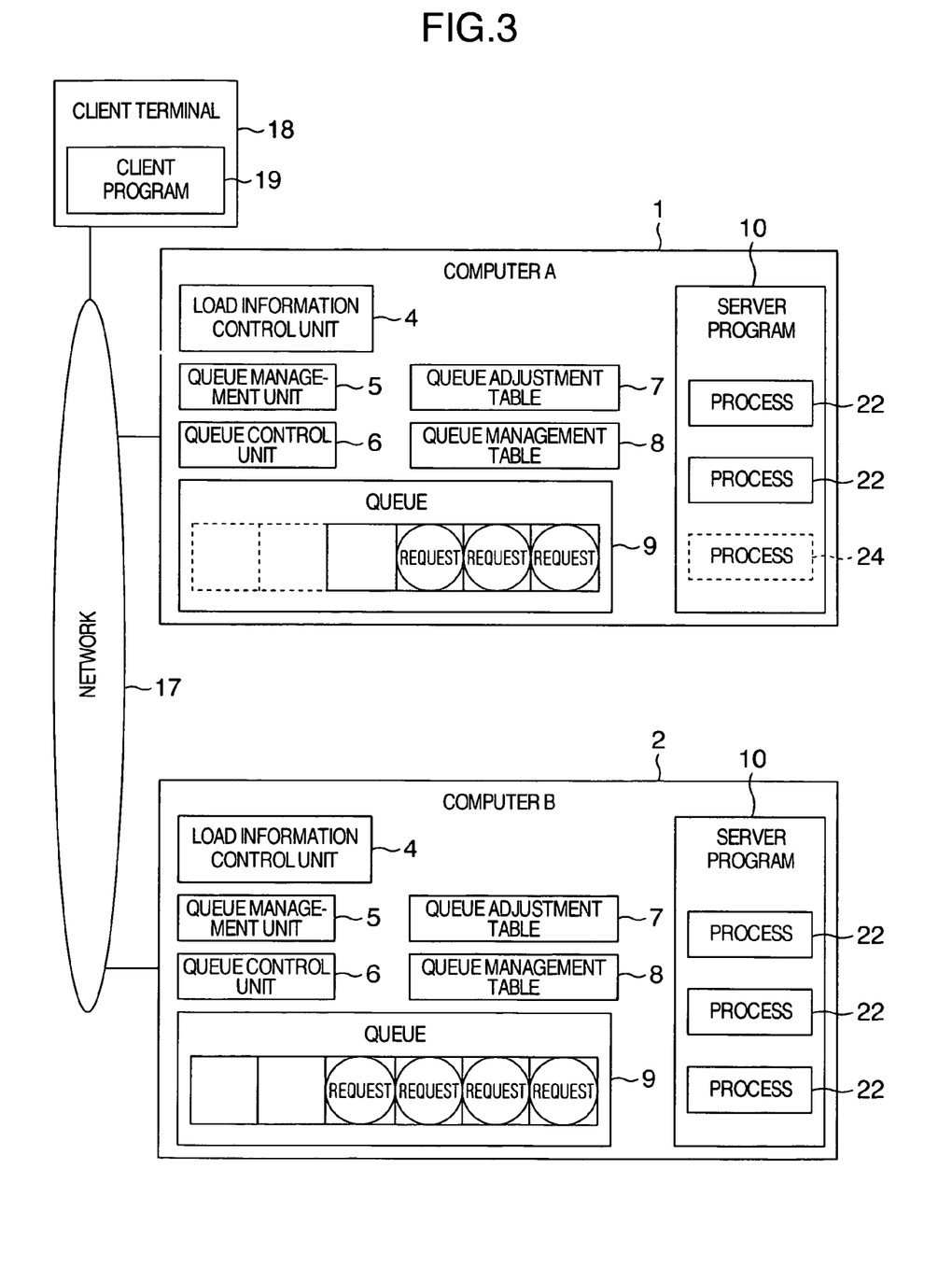
FIG. 3 is a diagram showing an example in which a queue length 37 and the number of simultaneously executing processes 38 have been changed.

FIG. 3 is a diagram showing an example in which a queue length 37 and the number of simultaneously executing processes 38 have been changed. FIG. 3 shows a state in which a server load level 36 of the computer A 1 was increased after the state shown in FIG. 2, so that the queue length 37 and the number of simultaneously executing processes 38 have been changed.

The server load level 36 is the level set for the response time of the server program 10, the CPU usage rate of queue of the server program 10, the CPU usage rate of queue of the overall computer A 1, or the like. The details of the server load level 36 will be described with reference to FIG. 7.

When a load on the computer A 1 is increased in the state shown in FIG. 2, the length of the queue 9 of the computer A 1 is changed as shown in FIG. 3. The usage rate of the queue of the computer A 1 is thereby increased from 0.5 to 0.75, which is higher than the usage rate of the queue of the computer B 2 of 0.67. When a client request is made in this state, the client request is assigned to the queue 9 of the computer B 2. With this arrangement, the standard deviation of the time during which the client request is waiting to be processed in the queue 9 of each of the computers is reduced. Together with the length of the queue, the number of processes 22 in the server program 10 to be executed simultaneously is also reduced. For reduction of the number of processes 22 to be executed simultaneously, processing of one of the processes 22 is stopped like a process 24. The load on the server program 10 is thereby reduced, and the processing time required for each request is reduced. The standard deviation of the response time of the server program 10 is thereby also reduced.

Figure 4:
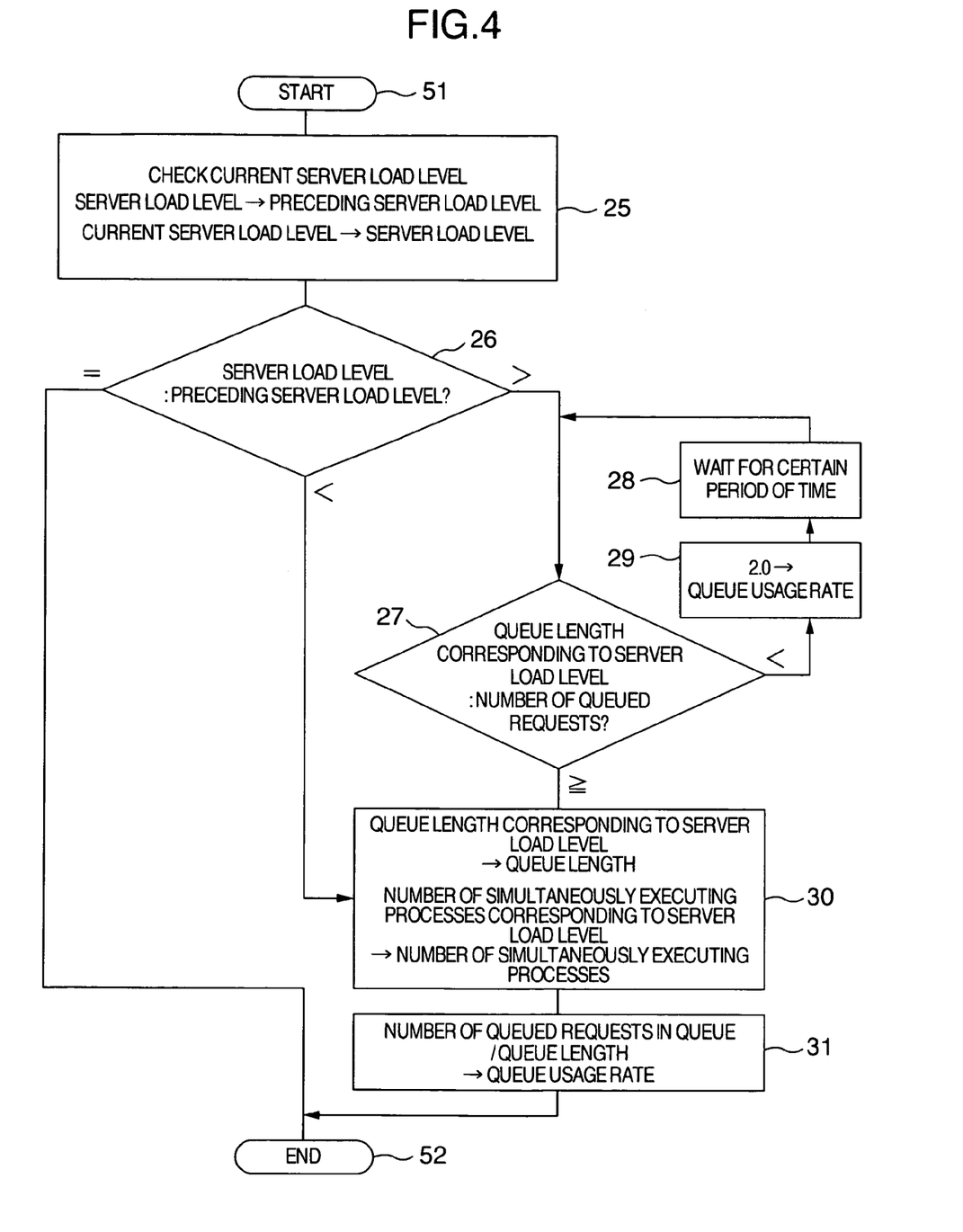
FIG. 4 is a flowchart showing processing steps of processing for dynamically changing a queue length and the number of simultaneously executing processes.

FIG. 4 is a flowchart showing processing steps of processing for dynamically changing the length of the queue and the number of simultaneously executing processes according to the load, in this embodiment. The flowchart in FIG. 4 is executed at predetermined intervals of time while the queue 9 and the server program 10 are operated. An embodiment of dynamically changing the length of the queue and the number of simultaneously executing processes according to the load will be described below, with reference to FIG. 4. Referencing and changing (updating) in regard to elements in the queue management table 8 will be performed below. It is assumed herein that referencing and changing in regard to each of the elements corresponding to a queue identifier 43 of the target queue 9 are performed.

As step 25, the queue control unit 6 measures the response time of each process in the current server program 10, and determines the load level corresponding to the response time. Then, after the queue control unit 6 has set a server load level 44 in the queue management table 8 to a preceding server load level 45 in the queue management table 8, the queue control unit 6 sets the current server load level to the server load level 44 in the queue management table 8.

Next, at step 26, the queue control unit 6 compares the server load level 44 in the queue management table 8 with the preceding server load level 45 in the queue management table 8. When it is found that the server load level 44 is the same as the preceding server load level 45, the operation is finished without changing a queue length 46 and the number of simultaneously executing processes 47 in the queue management table 8.

When it is found that the server load level 44 is smaller than the preceding server load level 45 at step 26, the queue control unit 6 changes the queue length 46 and the number of simultaneously executing processes 47 in the queue management table 8 to the queue length 37 and the number of simultaneously executing processes 38 in the queue adjustment table 7 corresponding to the server load level 36 in the queue adjustment table 7, respectively. Then, at step 31, the queue control unit 6 sets the ratio of the number of queued requests to the queue length to a queue usage rate 49 in the queue management table 8. The operation is then finished.

When it is found the server load level 44 is larger than the preceding server load level 45 at step 26, the queue control unit 6 compares the queue length 37 corresponding to the server load level 36 in the queue adjustment table 7 with the number of queued requests 48 in the queue management table 8 at step 27.

Figure 5:
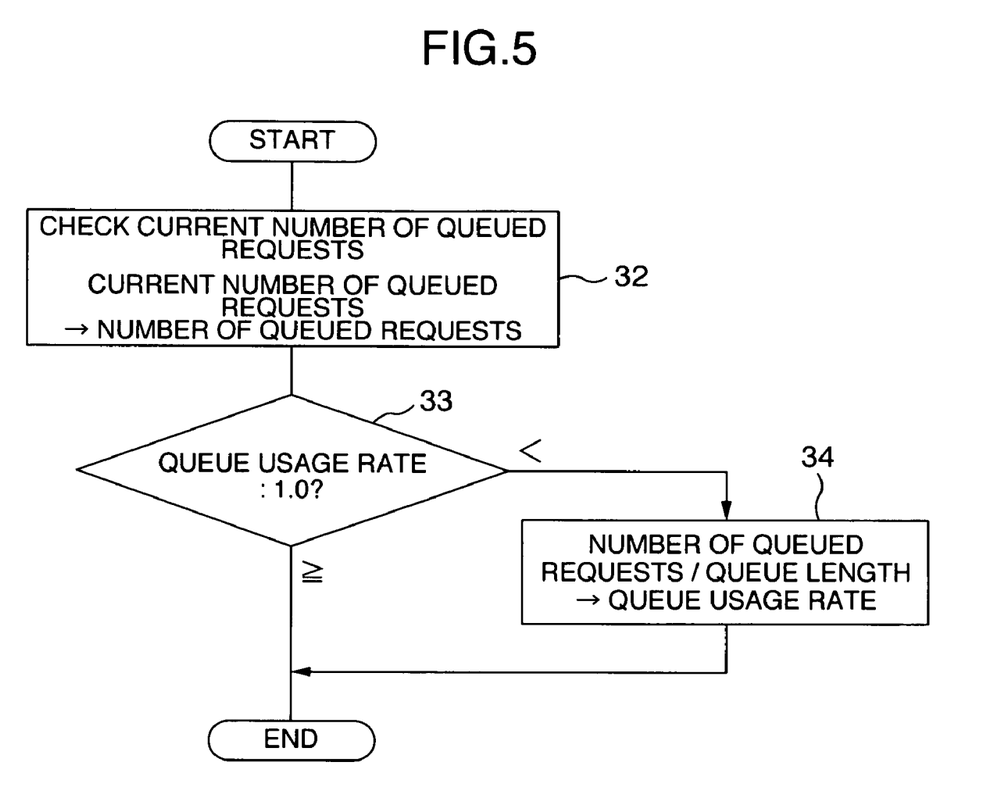
FIG. 5 is a flowchart showing processing steps for updating the number of queued requests 48 in a queue and a queue usage rate of queue 49.

When it is found that the number of queued requests 48 is larger, the queue management unit 6 sets the queue usage rate 49 in the queue management table 8 to 2.0 so as not to be changed by an algorithm in FIG. 5. Then, a predetermined period of time is waited for at step 28, and then the operation is returned to step 27 again.

When it is found that the number of queued requests 48 is the same as or smaller than the queue length 37, the queue control unit 6 changes the queue length 46 and the number of simultaneously executing processes 47 in the queue management table 8 to the queue length 37 and the number of simultaneously executing processes 38 corresponding to the server load level 36 in the queue adjustment table 7, respectively. Then, at step 31, the queue control unit 6 sets the ratio of the number of queued requests to the queue length to the queue usage rate 49 in the queue management table 8. Then, the operation is finished.

FIG. 5 is a flowchart showing processing steps of processing for updating the number of queued requests 48 in the queue 9 and the queue usage rate 49 in this embodiment. FIG. 5 shows the algorithm when the load information control unit 4 updates information on the number of queued requests 48 in the queue 9 and the queue usage rate 49 at predetermined intervals of time.

The flowchart in FIG. 5 is executed at the predetermined intervals of time while the queue 9 and the server program 10 are operated. The flowchart in FIG. 5 and the flowchart in FIG. 4 may be executed simultaneously. The embodiment of changing the number of queued requests 48 and the queue usage rate 49 will be described below with reference to FIG. 5.

At step 32, the queue management unit 5 checks the current number of queued requests in the target queue 9 and changes the number of queued requests 48 corresponding to the queue identifier 43 of the target queue in the queue management table 8. Next, at step 33, the queue usage rate 49 is compared with 1.0. When it is found that the queue usage rate of queue is larger than 1.0, the operation is finished. When it is found that the queue usage rate of queue is equal to or smaller than 1.0, the ratio of the number of queued requests to the queue length is set to the queue usage rate of queue 49 corresponding to the queue identifier 43 of the target queue in the queue management table 8. Then, the operation is finished.

After the queue usage rate of queue has been set as described above, each of the computers exchanges information on the queue usage rate of queue that has been set by the load information control unit 4 among the computers via the network interface 16. Then, according to the exchanged information on the queue usage rate of queue, client request assignment is performed, or processing that controls the number of processes to be simultaneously executed by the computer according to the changed value of the number of simultaneously executing processes is performed.

Figure 6:
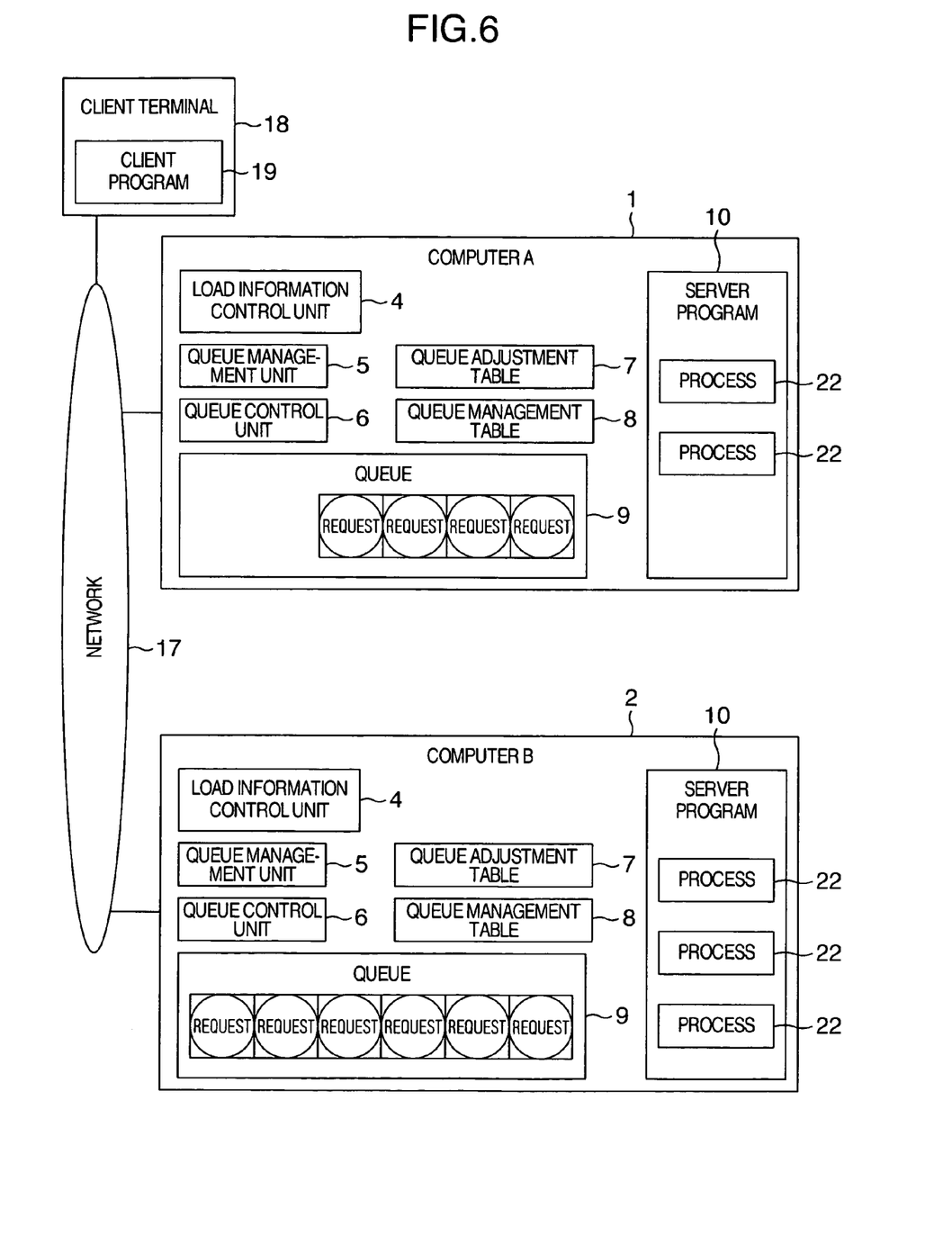
FIG. 6 is a diagram showing an example in which a queue length corresponding to the time-out period for a client request is set.

FIG. 6 is a diagram showing an example in which the queue length corresponding to the time-out period for a client request is set according to this embodiment. FIG. 6 shows a state in which the queue length is set so that when a large number of client requests have been made and the response times become the time-out period for the client requests, the queue usage rates of queues of all the computers become 1.0 or larger As the queue length, for example, the value obtained by dividing the time-out period of a client request by the response time of the server program divided by the number of simultaneously executing processes is employed.

The queue length is calculated as described above. Then, it is assumed that the queue length at each server load level (the response time of the server program 10) and in the number of simultaneously executing processes is calculated and that the result of calculation is stored in the queue adjustment table 7.

When one of the client terminals 18 executes the client program 19 to transmit a client request to the computer A 1 or B 2 through the network 17 in a state shown in FIG. 6, the queue management unit 5 of the computer that has received the client request tries to assign the client request to the queue 9 of the computer with a lower queue usage rate of queue. However, the queue usage rates obtained through the load information control unit 4 are all 1.0 or larger, so that the assignment cannot be performed. Thus, the computer returns a response indicating an error to the client program 19 through the network 17.

Assume that when the response of a client request has not been returned within a predetermined period of time, the request is to be regarded as a time out error. Then, when the queue length is adjusted as shown in FIG. 6 in view of the time during which the client request waits to be processed, the client request of which the response has not been returned within a predetermined period of time can be regarded as the time out error at a timing of assignment of the client request to the queue, without actually waiting for the time-out period to elapse. Efficiency of the system can be thereby improved.

Figure 7:
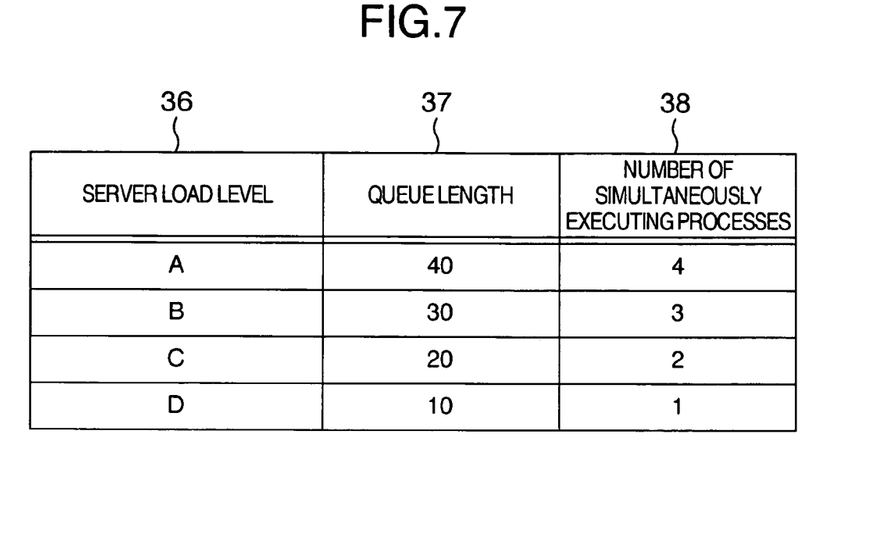
FIG. 7 is a table showing an example in which a queue adjustment table 7 is set.

FIG. 7 is a table showing an example in which the queue adjustment table 7 in this embodiment is set. FIG. 7 shows an example of the queue adjustment table 7 in which the queue length 37 and the number of simultaneously executing processes 38 at the server load level 36 are set. The server load level 36, and the queue length 37 and the number of simultaneously executing processes 38 corresponding to the server load level 36 are set in this table in advance. Then, the queue control unit 6 dynamically changes the queue length 46 and the number of simultaneously executing processes 47 in the queue management table 8 according to the server load level 36 in the queue adjustment table 7.

In the example shown in FIG. 7, the server load level is classified into four levels A, B, C, and D. The load at the server load level D is the highest, while the load at the server load level A is the lowest.

Figure 8:
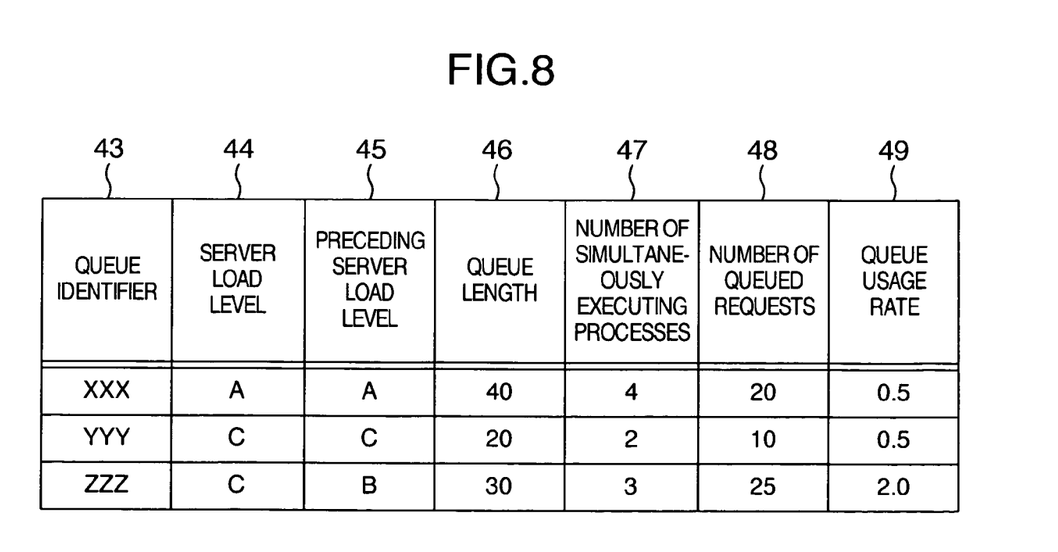
FIG. 8 is a table showing an example in which a queue management table 8 is set.

FIG. 8 is a table showing an example of the queue management table 8 in a certain state, in this embodiment. FIG. 8 shows the example of the queue management table 8 for managing the status of the queue 9. The queue management table 8 includes information on items such as the queue identifier 43, and the server load level 44, preceding server load level 45, queue length 46, number of simultaneously executing processes 47, number of queued requests 48, and queue usage rate 49 that correspond to the queue identifier 43.

When the queue control unit 6 dynamically changes the queue length and the number of simultaneously executing processes using an algorithm shown in FIG. 4, the queue control unit 6 updates the server load level 44, preceding server load level 45, queue length 46, number of simultaneously executing processes 47, and queue usage rate of queue 49 in this table, thereby managing the status of the queue 9. The number of queued requests 48 and the queue usage rate of queue 49 are updated according to the algorithm in FIG. 5. The queue usage rate 49 is updated using both of the algorithms in FIGS. 4 and 5.

FIG. 8 shows an example in which the queue adjustment table 7 in FIG. 7 has been utilized. In a row having the queue identifier 43 of ZZZ in this example, the server load level 44 is increased from the B level to the C level. The number of queued requests 48 in this row is 25, which is larger than the set value of 20 for the queue length 37 when the server load level 36 is C. Thus, the queue usage rate of queue 49 in this row has become 2.0.

As described above, in the load balancing system that uses a queue between a client and a server in this embodiment, assignment of a client request to the server is performed according to the usage rate of queue of the queue, and the length of the queue is dynamically changed. The period of time in which the client request is waiting to be processed during the response time of the client request is thereby made to be substantially the same in any queue, irrespective of the load on the server. The standard deviation of the response time of the client request is thereby reduced. Further, the number of simultaneously executing processes in the server is changed according to the load on the server. Thus, the period of time in which the processes are processed by the server during the response time of the client request is made to be substantially the same in any server. The standard deviation of the response time of the client request is thereby reduced.

Then, the following phenomena can be avoided by the reduction in the standard deviation of the response time of the client request:

deterioration of the overall performance of the load balancing system due to waiting for a client request from which no response is returned and the resultant processing delay of other process;

parts of client requests becoming time out errors; and reversal of the order of responses of the client requests;

When all the queues are full of waiting requests in a queue system in this embodiment, assignment of an incoming request to the queues cannot be performed. Thus, the incoming request is regarded as an error. However, assume that when the response of a client request has not been returned within a predetermined period of time, the request is to be regarded as a time out error. Then, when the length of a queue is adjusted in view of the time during which the client request waits in the queue, the client request of which the response has not been returned within the predetermined period of time can be regarded as the time out error at a fast timing of assignment of the client request to the queue. Efficiency of the system can be thereby improved.

As described above, according to the dynamic queue load balancing system in this embodiment, the queue length is dynamically changed according to the load on a computer. Thus, the standard deviation of the response time of a processing request can be reduced, so that the response times of all processing requests can be made to get back within a predetermined period of time.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A dynamic queue load balancing method for performing selective assignment of a processing request among queues of a plurality of computers, thereby dynamically implementing load balancing, the method comprising:

obtaining a load level indicating a level of a load on each of the computers, said load level being obtained based upon a response time for each process in a server;

referring to a queue management table including information on a queue length and a number of queued requests in each queue and a queue adjustment table including information on a queue length at each load level and changing the queue length in the queue management table to the queue length in the queue adjustment table corresponding to the obtained load level, by a storage device;

calculating a queue usage rate of queue of said each of the computers from the queue length and the number of queued requests in the queue management table;

exchanging information on the calculated queue usage rate of queue among the computers, through a communication device;

performing the selective assignment of the processing request according to the exchanged information on the queue usage rate of queue of said each of the computers; and setting the queue usage rate of queue in the queue management table to a predetermined value for preventing the change of the queue usage rate of queue by the storage device and waiting for a predetermined period of time when the number of queued requests in the queue management table is larger than the queue length in the queue adjustment table corresponding to the obtained load level.

2. The dynamic queue load balancing method according to claim 1, further comprising:

changing a number of simultaneously executing processes in the queue management table to a number of simultaneously executing processes in the queue adjustment table corresponding to the obtained load level by the storage device, and controlling a number of processes to be performed simultaneously by said each of the computers according to a value of the changed number of simultaneously executing processes.

3. The dynamic queue load balancing system according to claim 1, further comprising:

changing the queue length in the queue management table to the queue length in the queue adjustment table corresponding to the obtained load level by the storage device when the number of queued requests in the queue management table is equal to or smaller than the queue length in the queue adjustment table corresponding to the obtained load level.

4. The dynamic queue load balancing system according to claim 1, further comprising:

changing a number of simultaneously executing processes in the queue management table to a number of simultaneously executing processes in the queue adjustment table corresponding to the obtained load level by the storage device, and controlling a number of the processes to be executed simultaneously by said each of the computers according to a value of the changed number of simultaneously executing processes when the number of queued requests in the queue management table is equal to or smaller than the queue length in the queue adjustment table corresponding to the obtained load level.

5. The dynamic queue load balancing method according to claim 1, further comprising:

setting a value corresponding to a time-out period for the processing request as the queue length in the queue management table, and when the calculated queue usage rate of queue of a queue indicates a state in which the queue length is equal to the number of the queued requests, stopping the selective assignment of the processing request to the queue.

6. The dynamic queue load balancing method according to claim 1, further comprising:

changing the queue length in the queue management table to a larger value when the obtained load level is smaller than a preceding load level, and changing the queue length in the queue management table to a smaller value when the obtained load level is larger than the preceding load level.

7. The dynamic queue load balancing method according to claim 1, further comprising:

changing a number of simultaneously executing processes in the queue management table to a larger value when the obtained load level is smaller than a preceding load level, and changing the number of simultaneously executing processes in the queue management table to a smaller value when the obtained load level is larger than the preceding load level.

8. A dynamic queue load balancing system for performing selective assignment of a processing request among queues of a plurality of computers, thereby dynamically implementing load balancing, the system comprising:

a queue management table including information on a queue length and a number of queued requests in each queue;

a queue adjustment table including information on a queue length at each load level;

a queue control unit for obtaining a load level indicating a load on each of the computers, said load level being obtained based upon a response time for each process in a server, changing the queue length in the queue management table to the queue length in the queue adjustment table corresponding to the obtained load level by a storage device, and calculating a queue usage rate of queue of said each of the computers from the queue length and the number of queued requests in the queue management table, and for setting the queue usage rate of queue in the queue management table to a predetermined value for preventing the change of the queue usage rate of queue by the storage device and waiting for a predetermined period of time when the number of queued requests in the queue management table is larger than the queue length in the queue adjustment table corresponding to the obtained load level;

a load information control unit for exchanging information on the calculated queue usage rate of queue of said each of the computers among the computers through a communication device; and a queue management unit for performing the selective assignment of the processing request according to the exchanged information on the queue usage rate of queue of said each of the computers.

9. A program stored in memory for causing a computer to execute a dynamic queue load balancing method for performing selective assignment of a processing request among queues of a plurality of computers, thereby dynamically performing load balancing, the program comprising the steps of:

obtaining a load level indicating a level of a load on each of the computers, said load level being obtained based upon a response time for each process in a server;

referring to a queue management table including information on a queue length and a number of queued requests in each queue and a queue adjustment table including information on a queue length at each load level and changing the queue length in the queue management table to the queue length in the queue adjustment table corresponding to the obtained load level, by a storage device;

calculating a queue usage rate of queue from the queue length and the number of queued requests in the queue management table;

exchanging information on the calculated queue usage rate of queue among the computers through a communication device; and performing the selective assignment of the processing request according to the exchanged information on the queue usage rate of queue; and setting the queue usage rate of queue in the queue management table to a predetermined value for preventing the change of the queue usage rate of queue by the storage device and waiting for a predetermined period of time when the number of queued requests in the queue management table is larger than the queue length in the queue adjustment table corresponding to the obtained load level.

* * * * *